(12) United States Patent
Jung et al.

(10) Patent No.: US 10,717,175 B2
(45) Date of Patent: Jul. 21, 2020

(54) SENSOR CAP EXCHANGE TOOL DEVICE

(71) Applicants: Hyundai Motor Company, Seoul (KR); Kia Motors Corporation, Seoul (KR)

(72) Inventors: Gi Ryung Jung, Ulsan (KR); Yi Jun Son, Hwaseong-si (KR); Dong Ho Lee, Seongnam-si (KR); Se Ho Jung, Siheung-si (KR)

(73) Assignees: Hyundai Motor Company, Seoul (KR); Kia Motors Corporation, Seoul (KR)

( * ) Notice: Subject to any disclaimer, the term of this patent is extended or adjusted under 35 U.S.C. 154(b) by 449 days.

(21) Appl. No.: 15/377,333

(22) Filed: Dec. 13, 2016

(65) Prior Publication Data

US 2018/0009093 A1    Jan. 11, 2018

(30) Foreign Application Priority Data

Jul. 8, 2016    (KR) ........................ 10-2016-0086790

(51) Int. Cl.
*B25B 27/00* (2006.01)
*B25B 27/02* (2006.01)
(Continued)

(52) U.S. Cl.
CPC ........ *B25B 27/0035* (2013.01); *B25B 27/023* (2013.01); *F16C 43/045* (2013.01);
(Continued)

(58) Field of Classification Search
CPC ... B25B 27/0035; B25B 27/023; F16C 41/00; F16C 16/186; F16C 33/723; F16C 2233/00; F16C 43/045; B23P 19/04
(Continued)

(56) References Cited

U.S. PATENT DOCUMENTS 1,417,265 A * 5/1922 McClarran ............ B25B 27/023
29/263
1,459,269 A * 6/1923 Ullman ................ B25B 27/023
29/260
(Continued)

FOREIGN PATENT DOCUMENTS

CN    202106350 U    1/2012
CN    102922483 A    2/2013
(Continued)

*Primary Examiner* — Tyrone V Hall, Jr.
*Assistant Examiner* — Seahee Yoon
(74) *Attorney, Agent, or Firm* — Morgan, Lewis & Bockius LLP

(57) ABSTRACT

A sensor cap exchange tool device may include a support bolt; a support bracket that is fixed to a front end portion of the support bolt; a mover that has a second screw thread that is engaged with the first screw thread at of the support bracket; a tool guide that is rotatably engaged with the mover and that moves in the predetermined direction together with the mover according to a rotation of the mover and that has a tool insertion opening open in the predetermined direction; and a separation device and mounting device that are mounted in the tool guide and that moves with the tool guide according to a rotation of the mover and that comes in close contact with the sensor cap that is mounted in the wheel bearing assembly.

8 Claims, 11 Drawing Sheets

(51) Int. Cl.
*F16C 43/04* (2006.01)
*F16C 33/72* (2006.01)
*F16C 41/00* (2006.01)
*F16C 19/18* (2006.01)

(52) U.S. Cl.
CPC .......... *F16C 19/186* (2013.01); *F16C 33/723* (2013.01); *F16C 41/00* (2013.01); *F16C 2233/00* (2013.01); *F16C 2326/02* (2013.01)

(58) Field of Classification Search
USPC .................................. 29/256, 263, 264, 265
See application file for complete search history.

(56) References Cited

U.S. PATENT DOCUMENTS

| | | | | | |
|---|---|---|---|---|---|
| 1,783,649 | A | * | 12/1930 | Howell | B25B 27/023 29/263 |
| 2,050,005 | A | * | 8/1936 | Heegeman | B25B 27/062 29/263 |
| 2,380,980 | A | * | 8/1945 | Looney | B25B 27/062 29/263 |
| 2,406,445 | A | * | 8/1946 | Thompson | B25B 27/062 29/261 |
| 2,496,005 | A | * | 1/1950 | Grant | B25B 27/062 29/283 |
| 2,721,377 | A | * | 10/1955 | Hedlund | B25B 27/023 29/264 |
| 3,579,796 | A | * | 5/1971 | Fillion | B25B 27/023 29/263 |
| 4,059,883 | A | * | 11/1977 | Osborne | B25B 27/023 29/259 |
| 4,426,758 | A | * | 1/1984 | Castoe | B25B 27/0028 29/265 |
| 4,586,229 | A | * | 5/1986 | Pendola | B25B 27/064 29/252 |
| 4,870,740 | A | * | 10/1989 | Klann | B25B 27/023 29/263 |
| 4,875,266 | A | * | 10/1989 | Batten | B25B 27/023 29/263 |
| 5,033,177 | A | * | 7/1991 | Gathright | B25B 27/062 29/264 |
| 5,228,180 | A | * | 7/1993 | Bauer | B25B 27/062 29/258 |
| 5,784,783 | A | * | 7/1998 | Carpenter | B25B 27/023 29/426.5 |
| 5,894,665 | A | * | 4/1999 | Olmsted | B25B 27/062 29/258 |
| 9,956,674 | B2 | * | 5/2018 | Hargrove | B25B 27/28 |
| 2003/0188410 | A1 | * | 10/2003 | English | B25B 27/023 29/263 |
| 2006/0133708 | A1 | * | 6/2006 | Meeker | B60B 27/00 384/544 |
| 2006/0196029 | A1 | * | 9/2006 | Klann | B25B 27/023 29/260 |
| 2009/0185767 | A1 | * | 7/2009 | Nollenberger | F16C 35/00 384/139 |
| 2011/0214269 | A1 | * | 9/2011 | Yu | B23P 19/04 29/259 |
| 2012/0189234 | A1 | * | 7/2012 | Torii | B60B 27/0005 384/448 |

FOREIGN PATENT DOCUMENTS

| | | |
|---|---|---|
| CN | 104889929 A | 9/2015 |
| CN | 104889932 A | 9/2015 |
| JP | 64-052664 U | 3/1989 |
| KR | 20-1999-012556 U | 4/1999 |
| KR | 10-2005-0114788 A | 12/2005 |
| KR | 10-2015-0000701 A | 1/2015 |

* cited by examiner

SENSOR CAP EXCHANGE TOOL DEVICE

CROSS-REFERENCE TO RELATED APPLICATION

The present application claims priority to Korean Patent Application No. 10-2016-0086790 filed on Jul. 8, 2016, the entire contents of which is incorporated herein for all purposes by this reference.

BACKGROUND OF THE INVENTION

Field of the Invention

The present invention relates a sensor cap exchange tool device that removes and installs a sensor cap that is fixed to the inside of a sensor that is fixed to the outer wheel side of a wheel bearing assembly to detect a rotation of an inside wheel.

Description of Related Art

A wheel bearing that is used for a vehicle is mounted in a vehicle wheel to support a load of the wheel and the vehicle, receives a force of a drive shaft to minimize rotation resistance and to transfer the minimized rotation resistance to the wheel, and supports an impact of an axle occurring upon rotating the vehicle and an impact occurring upon vertically bouncing the vehicle.

The wheel bearing includes an outer wheel, a wheel hub, an inner wheel that is mounted in the wheel hub, a plurality of electric motion bodies that are interposed between the outer wheel and the wheel hub and between the outer wheel and the inner wheel, and a seal assembly that seals a gap that is formed between the outer wheel and the wheel hub.

The outer wheel is formed larger than an exterior diameter of the wheel hub to insert and support the wheel hub into the inside thereof. The outer wheel is engaged with a fixing body such as a knuckle to be fixed not to rotate.

Further, as described above, a wheel speed measuring device that measures a rotation speed of a wheel that is rotatably supported through a wheel bearing to use the rotation speed in an antilock brake system may be installed in a wheel bearing.

The wheel speed measuring device may include an encoder that is mounted to integrally rotate in a front end portion of the inside of a shaft direction of the inner wheel and a so-called cap type wheel speed sensor that detects a rotation of the encoder.

The cap type wheel speed sensor may include a sensor housing that is mounted in a form that is inserted into an interior diameter of the outer wheel, a hole element that is mounted in a front end portion of the outside of a shaft direction opposite to the encoder in the sensor housing, and an insert terminal that is inserted into the sensor housing in order to draw out a detection signal of the hole element to the outside.

In order to replace or repair a wheel speed sensor, by entirely replacing a wheel bearing assembly including an inner wheel, an outer wheel, and a hub, a repair cost and time may increase and an A/S cost may increase.

The information disclosed in this Background of the Invention section is only for enhancement of understanding of the general background of the invention and should not be taken as an acknowledgement or any form of suggestion that this information forms the prior art already known to a person skilled in the art.

BRIEF SUMMARY

Various aspects of the present invention are directed to providing a sensor cap exchange tool device having advantages of being capable of reducing an entire repair cost and time and an A/S cost by separating and mounting only a sensor cap that is mounted in a wheel bearing assembly instead of exchanging the wheel bearing assembly.

Various aspects of the present invention are directed to providing a sensor cap exchange tool device that separates and mounts a wheel speed detection device that is engaged with a rotation central portion of an wheel bearing assembly that is mounted in a knuckle of a vehicle to detect a rotation speed of a wheel and a sensor cap that covers the wheel speed detection device at the outside including: a support bolt having the rear end portion that is screw engaged with a bolt hole of the knuckle to be fixed to the bolt hole; a support bracket that is fixed to a front end portion of the support bolt and that has an inside circumference having a first screw thread; a mover that has a second screw thread that is engaged with the first screw thread at an outside circumference of one side and that fixes a mover nut to a rotation central portion of a front end surface and that moves in the front-rear direction about the support bracket according to a rotate location; a tool guide that is rotatably engaged with the rear side of the mover through a bearing and that moves in the front-rear direction together with the mover according to a rotation of the mover and that has a tool insertion hole that is opened in the front-rear direction; and a separation device and mounting device that are mounted in the tool insertion hole of the tool guide and that moves in the front-rear direction together with the tool guide according to a rotation of the mover and that comes in close contact with an outside circumference of the sensor cap that is mounted in the wheel bearing assembly to separate the sensor cap from the wheel bearing assembly by pulling the sensor cap or to mount a new sensor cap in the wheel bearing assembly by pushing the new sensor cap.

The separation device may include a collet that has a cup structure having a cap insertion groove that is opened to the rear side to insert the sensor cap and that has a collet fixing portion that is extended to the front side to be fixed to the mover at a central portion of the front end portion and that has an outside circumference corresponding to an inside circumference of the tool insertion hole and that has a structure having an increasing outside diameter as advancing to the rear side and that is retracted along an inside circumference form of the tool insertion hole and that has a slot to press and fix an outside circumference of the sensor cap, when the tool guide moves backward thereof.

The collet fixing portion may be a bolt structure of collet bolt, the collet bolt may penetrate a central portion of the mover to be protruded forward, and a collet nut may be engaged with the portion and thus the collet may be fixed to the mover.

The slit may be formed at a predetermined gap along a circumference of the collet, and a circular extension portion may be formed within the slit.

A front end portion of the support bolt may penetrate a penetration hole of an edge portion of the support bracket, and a support nut may be screw engaged with the front end portion of the support bolt to fix the support bracket to the support bolt.

The mounting device may include an installer that has an outside circumference corresponding to an inside circumference of the tool insertion hole and that mounts the new sensor cap in the wheel bearing assembly by pushing a cap jaw that is formed along a circumference of the new sensor cap, when the tool guide moves forward thereof.

An installer jaw that comes in close contact with a rear end surface of the tool guide may be formed along an outside circumference such that the installer moves backward together with the tool guide when the tool guide moves backward thereof.

The installer may include an outside diameter absorption device that compensates an outside diameter tolerance of the new sensor cap, and the outside diameter absorption device may include an outside diameter absorption ball that protrudes to an inside circumference of the installer, and the outside diameter absorption ball may elastically come in close contact with an outside circumference of the new sensor cap.

At an inside circumference of the installer, guide pins that guide a connector that protrudes to an outside surface of the new sensor cap may be protruded to both sides.

At the tool guide, a check hole may be formed to view the inside from the outside.

According to an exemplary embodiment of the present invention for achieving such an object, by rotating a mover based on a support bracket that is fixed to the outside of a knuckle through a support bolt, a tool guide that is mounted in the mover can move forward, and a sensor cap can be easily removed using a collet that is mounted in the tool guide.

Further, a tool guide that is mounted in the mover can move rearward, and a sensor cap can be easily mounted using an installer that is mounted in the tool guide.

The methods and apparatuses of the present invention have other features and advantages which will be apparent from or are set forth in more detail in the accompanying drawings, which are incorporated herein, and the following Detailed Description, which together serve to explain certain principles of the present invention.

Figure 1:
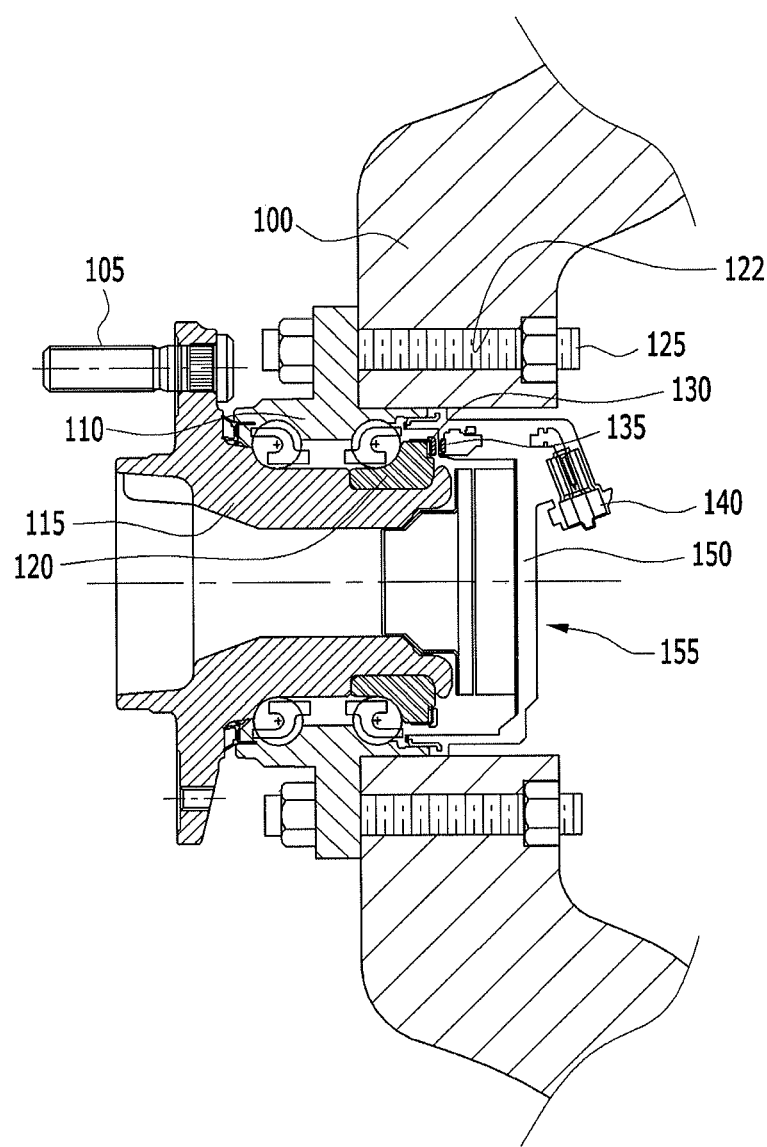
FIG. 1 is a schematic cross-sectional view of a wheel bearing assembly to which a sensor cap exchange tool device is applied according to an exemplary embodiment of the present invention.

It should be understood that the appended drawings are not necessarily to scale, presenting a somewhat simplified representation of various features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that the present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

Hereinafter, an exemplary embodiment of the present invention will be described in detail with reference to the accompanying drawings.

Further, in the drawings, a size and thickness of each element are randomly represented for better understanding and ease of description, and the present invention is not limited thereto and the thickness of several portions and areas are exaggerated for clarity.

The drawings and description are to be regarded as illustrative in nature and not restrictive. Like reference numerals designate like elements throughout the specification.

In the following description, terms including a first and a second used in names of constituent elements are used for distinguishing constituent elements having the same name and do not limit order thereof.

FIG. 1 is a schematic cross-sectional view of a wheel bearing assembly to which a sensor cap exchange tool device is applied according to an exemplary embodiment of the present invention.

Referring to FIG. 1, constituent elements of an wheel bearing assembly include a knuckle 100, a hub bolt 105, an outer wheel 110, an inside wheel 115, a hub 120, a wheel speed sensor 155, a sensor cap 150, a connector 140, a hole element 135, an encoder 130, a knuckle bolt 125, and a knuckle bolt hole 122, and in the inside wheel 115, the outer wheel 110, and the hub 120, the outer wheel 110 is fixed to the knuckle 100 through the knuckle bolt 125, and the inside wheel 115 has a structure rotating based on the outer wheel 110.

The wheel speed sensor 155 is mounted in the hub 120 that is disposed at a central portion of the knuckle 100 and detects a rotation of the encoder 130 rotating together with the hub 120 through the hole element 135, and the wheel speed sensor 155 includes the sensor cap 150, and at an outside surface of the sensor cap 150, the connector 140 that is electrically connected to the outside is fixed.

When exchanging the wheel speed sensor 155, it is difficult to separate the sensor cap 150 and thus an entire wheel bearing assembly is exchanged, and in an exemplary embodiment of the present invention, by using a tool device that separates the sensor cap 150 to exchange the wheel speed sensor 155, a replacement cost and time can be reduced. Such a tool device will be described in detail with reference to FIGS. 2 to 11.

Figure 2:
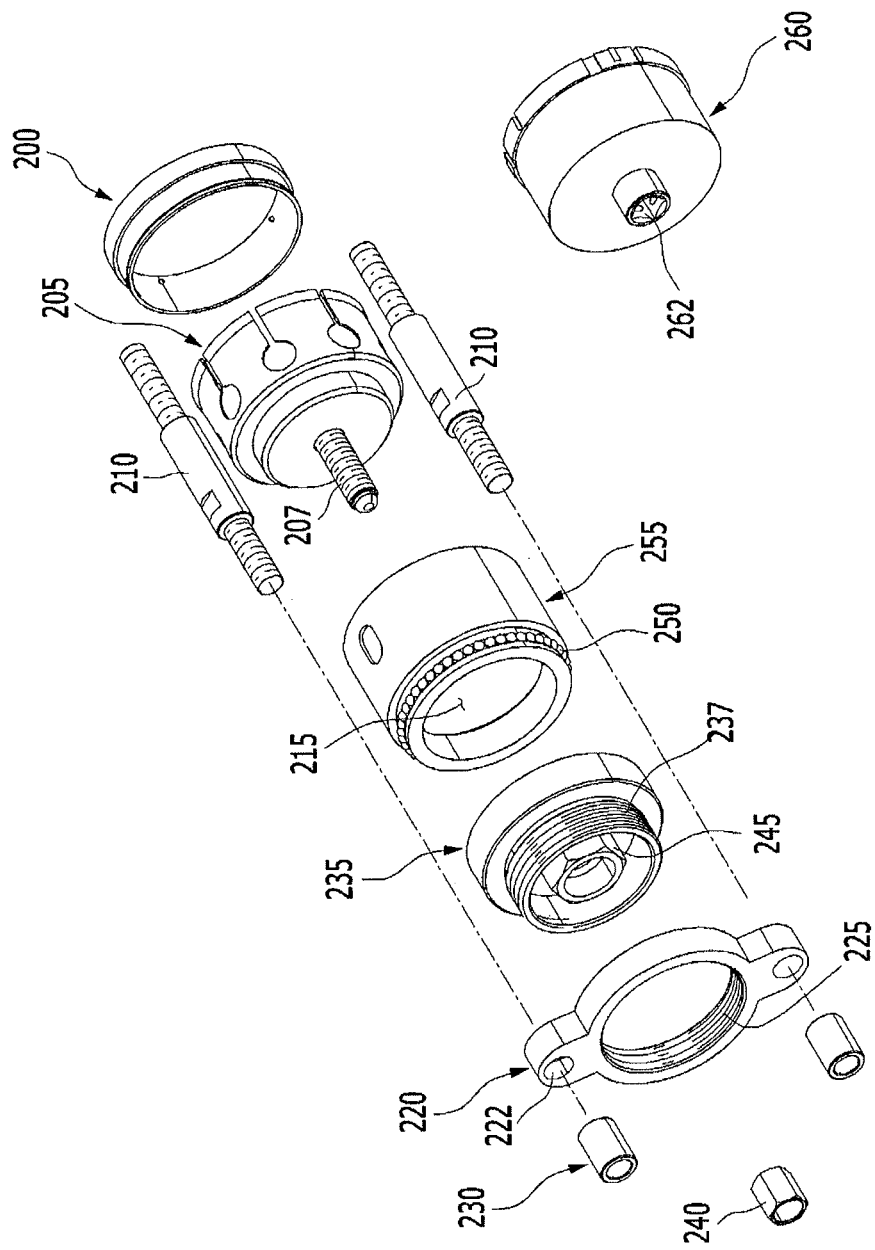
FIG. 2 is an exploded perspective view of a sensor cap exchange tool device according to an exemplary embodiment of the present invention.

FIG. 2 is an exploded perspective view of a sensor cap exchange tool device according to an exemplary embodiment of the present invention.

Referring to FIG. 2, the sensor cap exchange tool device includes an installer 200, a collet 205, a support bolt 210, a tool guide 255, a tool insertion hole 215, a bearing 250, a support bracket 220, a penetration hole 222, a first screw thread 225, a mover 235, a second screw thread 237, a collet nut 240, and a mover nut 245, and a cleaner 260 including a tool engagement portion 262 as a cleaning tool is prepared.

At the rear end portion and the front end portion of a support nut 230, a screw thread is formed, and a screw thread that is formed at the rear end portion is screw engaged with the knuckle bolt hole 122 of the knuckle 100.

At an edge portion of the support bracket 220, the penetration hole 222 in which the front end portion of the support bolt 210 penetrates is formed, and the support nut 230 fixes the support bracket 220 to the front end portion of the support bolt 210.

At an inside circumference of the support bracket 220, the first screw thread 225 is formed, at one side of an outside circumference of the mover 235, the second screw thread 237 is formed, and the mover 235 is inserted from the rear side to the front side of the support bracket 220 to be screw engaged through the first and second screw threads 225 and 237. Therefore, the mover 235 has a structure moving in the front-rear direction according to a rotate location thereof.

At the rear end portion of the mover 235, the tool guide 255 is rotatably disposed through the bearing 250, and the tool insertion hole 215 is formed therein. Here, the tool guide 255 may move in the front-rear direction together with the mover 235 in a stop state regardless of a rotation location of the mover 235.

In an exemplary embodiment of the present invention, the collet 205 is used for separating the sensor cap 150, and the installer 200 is used for mounting the sensor cap 150.

Figure 3:
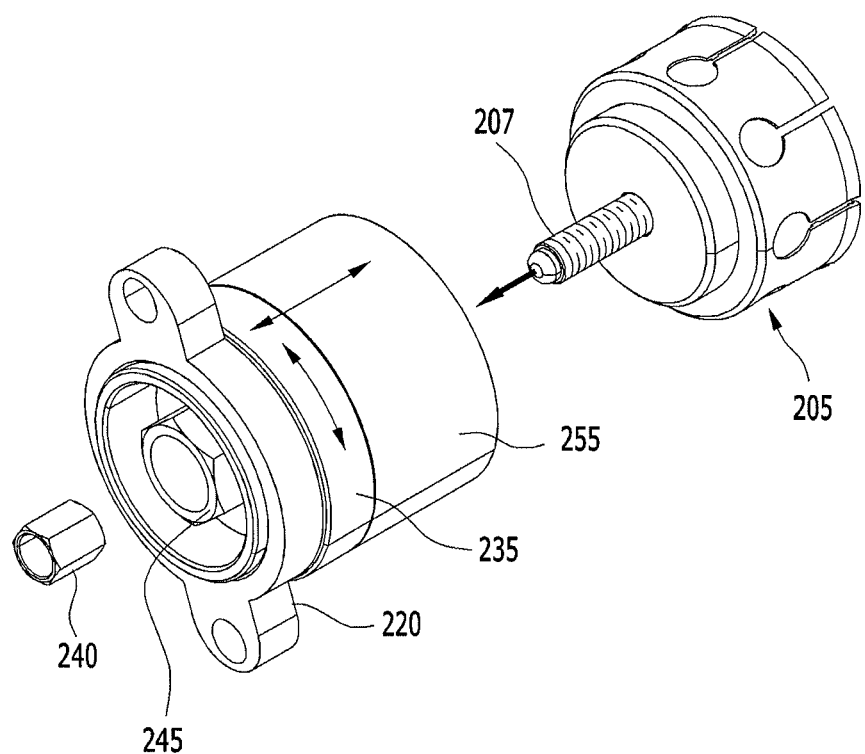
FIG. 3 is a perspective view illustrating a state in which a collet is mounted in a sensor cap exchange tool device according to an exemplary embodiment of the present invention.

FIG. 3 is a perspective view illustrating a state in which a collet is mounted in a sensor cap exchange tool device according to an exemplary embodiment of the present invention.

Referring to FIG. 3, the collet 205 has a cup shape that is opened to the rear side, and at a central portion of the front surface, a collet bolt 207 is extended forward and fixed.

The collet bolt 207 is inserted into the tool insertion hole 215 of the tool guide 255 and penetrates a central portion of the mover 235, and the collet 205 is inserted into the tool guide 255. The collet nut 240 is screw engaged with a front end portion of the collet bolt 207 and thus the collet 205 is fixed to the mover 235 side.

Figure 4:
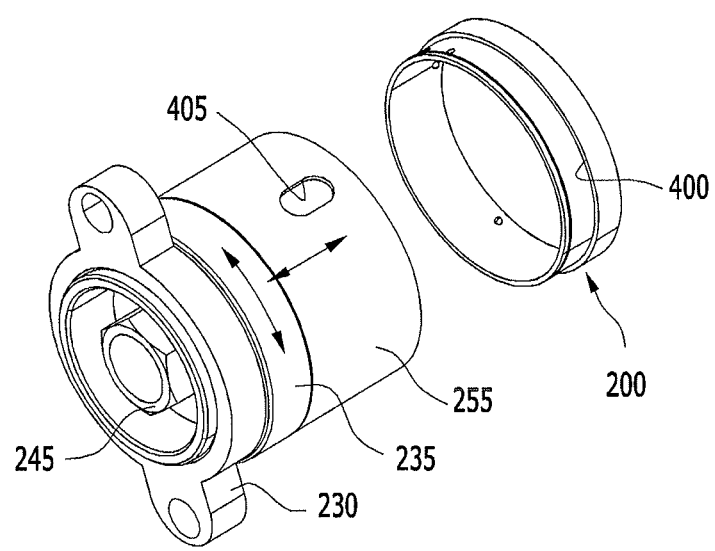
FIG. 4 is a perspective view illustrating a state in which an installer is mounted in a sensor cap exchange tool device according to an exemplary embodiment of the present invention.

FIG. 4 is a perspective view illustrating a state in which an installer is mounted in a sensor cap exchange tool device according to an exemplary embodiment of the present invention.

Referring to FIG. 4, the installer 200 has a circular ring shape, is mounted within the tool guide 255 instead of the collet 205, and performs a function of mounting the sensor cap 150 in the wheel bearing assembly according to a movement of the mover 235 and the tool guide 255.

Figure 5:
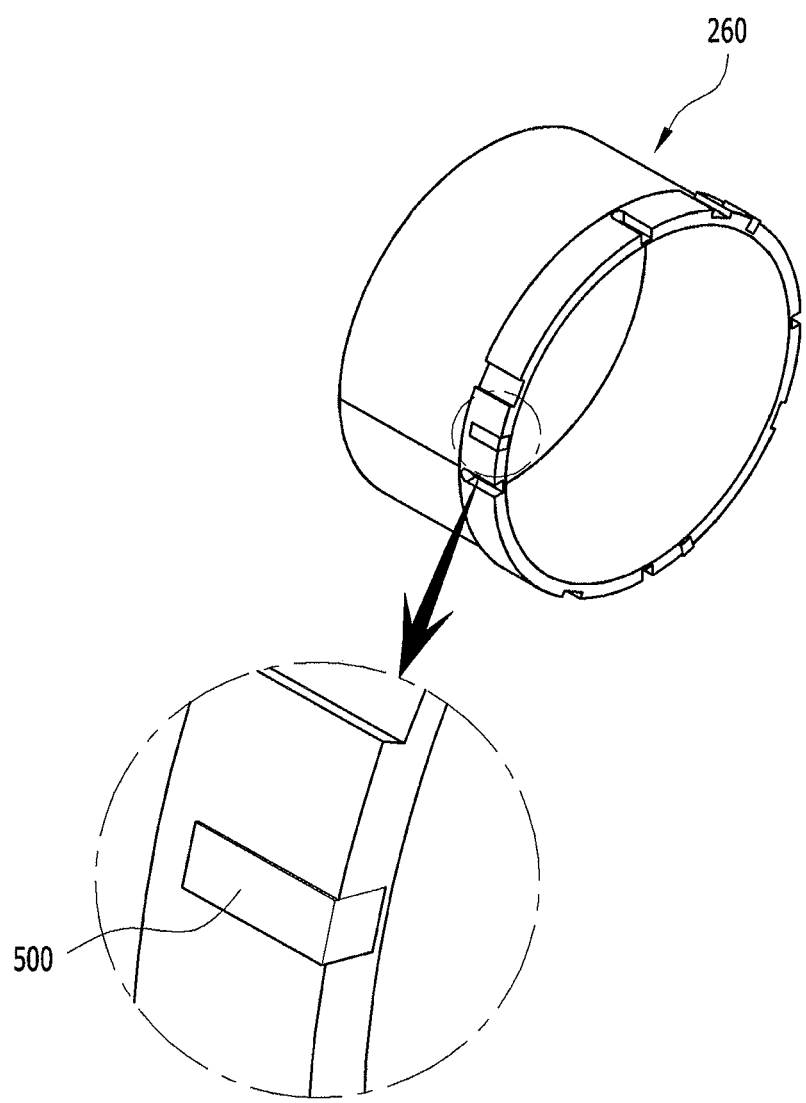
FIG. 5 is a perspective view of a cleaner according to an exemplary embodiment of the present invention.

FIG. 5 is a perspective view of a cleaner according to an exemplary embodiment of the present invention.

Referring to FIG. 5, at a central portion of a front surface of the cleaner 260, a tool engagement portion 262 is formed, and at an outside circumference of the cleaner 260, a cleaning protrusion 500 is formed at a predetermined gap in a rotating direction.

The cleaner 260 is inserted between an outside circumference of the sensor cap 150 and an inside circumference of the knuckle 100 in an wheel bearing assembly, and when rotating the cleaner 260 using a tool that is engaged with the tool engagement portion 262, the cleaning protrusion 500 performs a function of removing a foreign substance that is formed between an inside circumference of the knuckle 100 and an outside circumference of the sensor cap 150.

The cleaner 260 has a structure that rotates by a rotate tool and effectively prevents an external pollution material from entering into a wheel bearing assembly upon exchanging the sensor cap 150.

Figure 6:
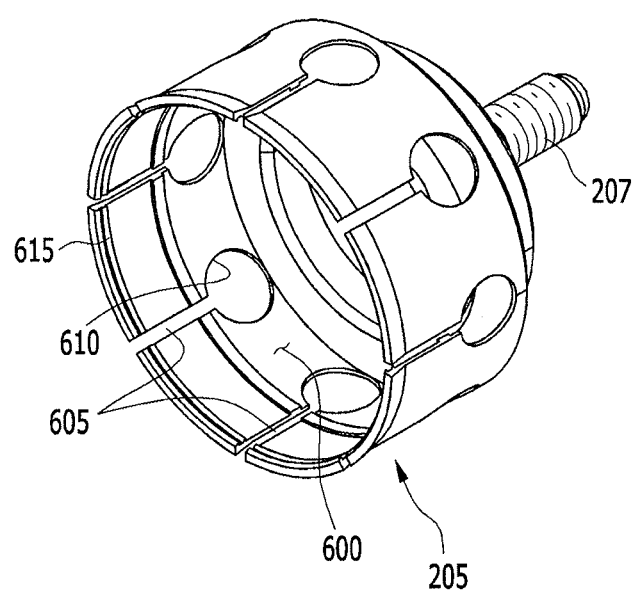
FIG. 6 is a perspective view of a collet according to an exemplary embodiment of the present invention.

FIG. 6 is a perspective view of a collet according to an exemplary embodiment of the present invention.

Referring to FIG. 6, the collet 205 has a cup structure having a sensor cap insertion hole 600 that is opened to the rear side, and at a central portion of a front surface, the collet bolt 207 is extended by a predetermined distance forward thereof. The collet bolt 207 is engaged with the collet nut 240 and thus the collet 205 is fixed to the mover 235.

The collet 205 has a structure in which an outside diameter of a rear end portion is separated backward, and a slot 605 is formed at a predetermined gap along a circumference thereof such that an outside diameter of the collet 205 reduces according to an insertion location of the tool guide 255. Further, at the inside of the slot 605, a circular slot extension portion 610 is formed.

That is, a portion that is separated from the collet 205 to the outside has a concentrating structure according to an inside circumference form of the tool guide 255.

Further, at an inside circumference of a rear end portion of the collet 205, a fixing protrusion 615 for securely fixing the sensor cap 150 is formed to easily fix the mounted sensor cap 150.

Figure 7:
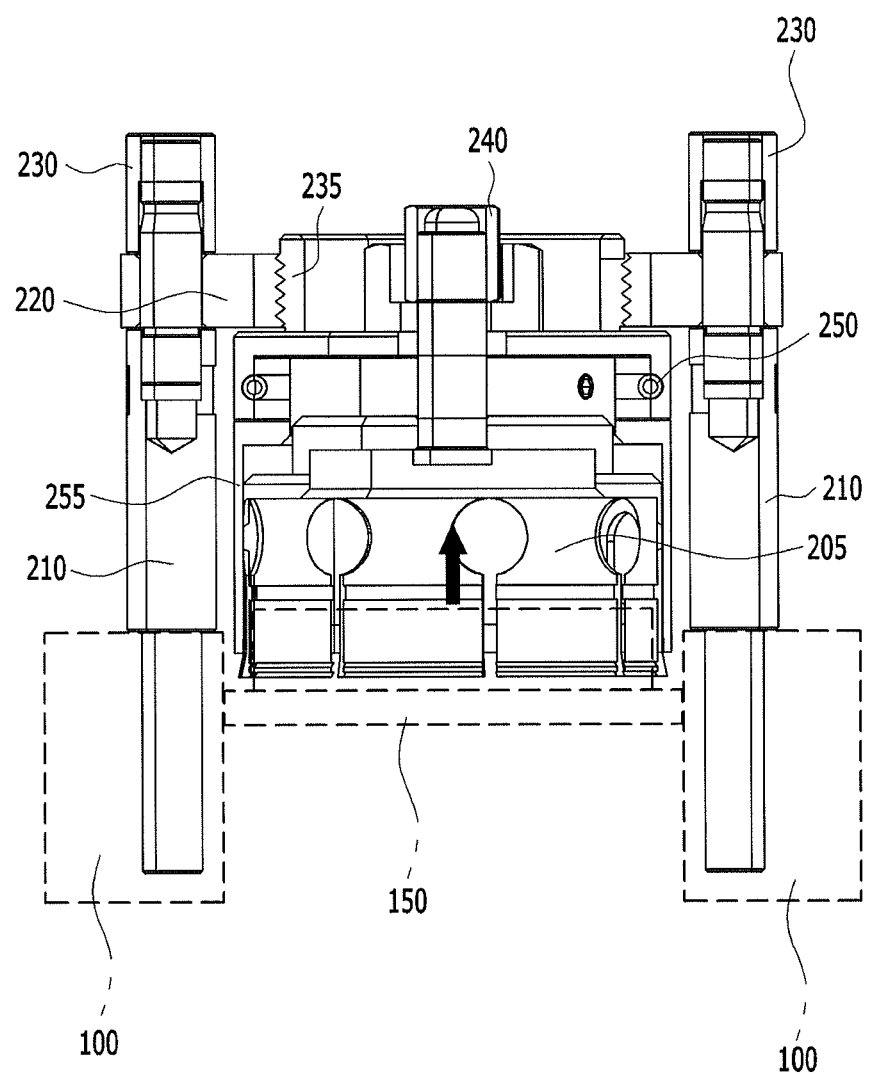
FIG. 7 is a schematic cross-sectional view illustrating a state in which a sensor cap exchange tool device separates a sensor cap according to an exemplary embodiment of the present invention.

FIG. 7 is a schematic cross-sectional view illustrating a state in which a sensor cap exchange tool device separates a sensor cap according to an exemplary embodiment of the present invention.

Referring to FIG. 7, the mover 235 and the tool guide 255 are together mounted in the support bracket 220, and the collet 205 is inserted into the tool guide 255. The collet nut 240 is engaged with the collet bolt 207 to prevent the collet 205 from being separated from the tool guide 255.

In this state, the support bolt 210 is screw engaged with the knuckle 100 and is fixed to the support bracket 220 through the support nut 230. In the instant case, the sensor cap 150 is inserted into the collet 205.

By rotating forward the mover 235, an operator moves the tool guide 255 to the sensor cap 150 side, and as the tool guide 255 moves to the sensor cap 150 side, an inside circumference of the tool guide 255 reduces an outside diameter of the collet 205 and thus the fixing protrusion 615 of the collet 205 comes in close contact with an outside circumference of the sensor cap 150. In this state, the collet nut 240 may be additionally tightened.

By reversely rotating the mover 235 through the mover nut 245 using a tool, the operator moves the tool guide 255 and the collet 205 to the outside, and as the tool guide 255 moves to the outside, the collet 205 together with the tool guide 255 holds the sensor cap 150 and moves to the outside. Therefore, the sensor cap 150 is separated from the wheel bearing assembly.

Figure 8:
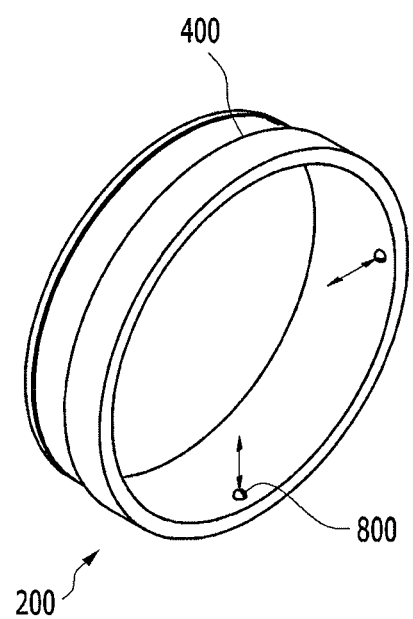
FIG. 8 is a perspective view of an installer according to an exemplary embodiment of the present invention.

FIG. 8 is a perspective view of an installer according to an exemplary embodiment of the present invention.

Referring to FIG. 8, at an outside circumference of the installer 200, an installer jaw 400 that is supported by a rear end surface of the tool guide 255 is formed, and the installer 200 pushes a cap jaw 900 (see FIG. 9) of the sensor cap 150 according to a movement of the tool guide 255, mounting the sensor cap 150 in an wheel bearing assembly.

At an inside circumference of the installer 200, an outside diameter absorption ball 800 is protruded, and the outside diameter absorption ball 800 elastically comes in close contact with an outside circumference of the sensor cap 150 to absorb an outside diameter of the sensor cap 150.

Figure 9:
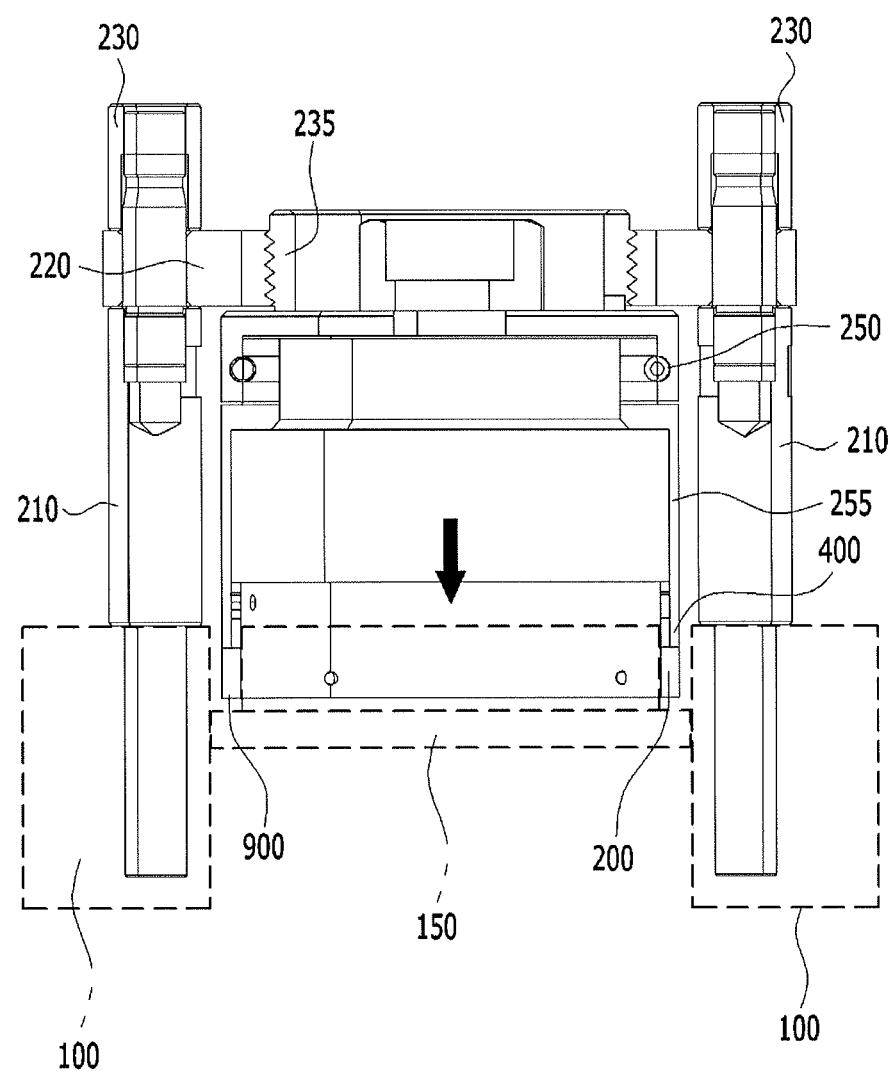
FIG. 9 is a schematic cross-sectional view illustrating a state in which a sensor cap exchange tool device mounts a sensor cap according to an exemplary embodiment of the present invention.

FIG. 9 is a schematic cross-sectional view illustrating a state in which a sensor cap exchange tool device mounts a sensor cap according to an exemplary embodiment of the present invention.

Referring to FIG. 9, the mover 235 and the tool guide 255 are together mounted in the support bracket 220, and at the inside of the tool guide 255, the installer 200 is engaged. Here, the installer jaw 400 is supported by the tool guide 255. A new sensor cap 150 is inserted into the installer 200.

In this state, the support bolt 210 is screw engaged with the knuckle 100 and is fixed to the support bracket 220 through the support nut 230.

By rotating forward the mover 235, the operator moves the tool guide 255 downward, as shown in FIG. 9, and as the tool guide 255 moves downward, the sensor cap 150 is mounted in the wheel bearing assembly. In the instant case, a low end surface of the installer 200 supports the cap jaw 900.

By reversely rotating the mover 235, the operator moves the tool guide 255 and the collet 205 upward and thus the sensor cap 150 and the installer 200 are separated.

Figure 10:
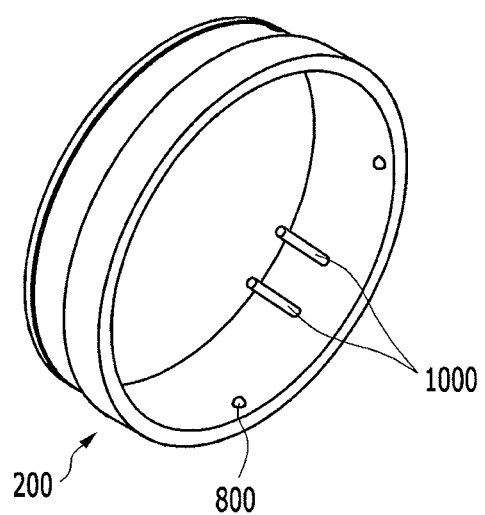
FIG. 10 is a perspective view of an installer according to another exemplary embodiment of the present invention.

FIG. 10 is a perspective view of an installer according to another exemplary embodiment of the present invention.

Referring to FIG. 10, as described above, at an inside circumference of the installer 200, the outside diameter absorption ball 800 is protruded, and the outside diameter absorption ball 800 elastically comes in close contact with an outside circumference of the sensor cap 150.

At one side of an inside circumference of the installer 200, connector guide pins 1000 are protruded to both sides. The connector 140 of the sensor cap 150 is located between the connector guide pin 1000, and a rotation location of the sensor cap 150 can be easily set through a structure of the connector guide pin 1000.

Figure 11:
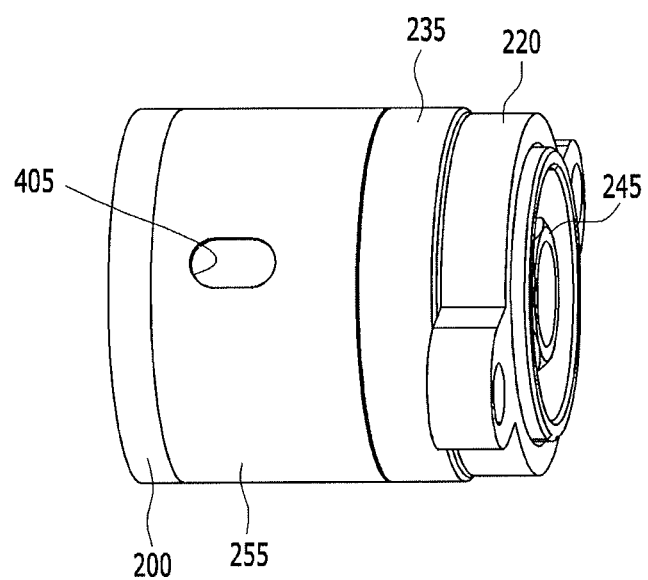
FIG. 11 is a partial perspective view of a sensor cap exchange tool device according to an exemplary embodiment of the present invention.

FIG. 11 is a partial perspective view of a sensor cap exchange tool device according to an exemplary embodiment of the present invention.

Referring to FIG. 11, at the tool guide 255, a test hole 405 that can check the inside is formed, and the operator can easily check a mounting state of the sensor cap 150 and a location of the connector 140 through the test hole 405.

For convenience in explanation and accurate definition in the appended claims, the terms "upper", "lower", "inner", "outer", "up", "down", "upper", "lower", "upwards", "downwards", "front", "rear", "back", "inside", "outside", "inwardly", "outwardly", "interior", "exterior", "inner", "outer", "forwards", and "backwards" are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A sensor cap exchange tool device that separates and mounts a wheel speed detection device that is engaged with a rotation central portion of a wheel bearing assembly that is mounted in a knuckle of a vehicle to detect a rotation speed of a wheel and a sensor cap that covers the wheel speed detection device at an outside, the sensor cap exchange tool device comprising:

a support bolt having a rear end portion that is screw engaged with a bolt opening of the knuckle to be fixed to the bolt opening;

a support bracket that is fixed to a front end portion of the support bolt and that has an inside circumference having a first screw thread;

a mover that has a second screw thread that is engaged with the first screw thread at an outside circumference of a first side and that fixes a mover nut to a rotation central portion of a front end surface and that moves in a predetermined direction about the support bracket according to a rotation location;

a tool guide that is rotatably engaged with a rear side of the mover through a bearing and that moves in the predetermined direction together with the mover according to a rotation of the mover and that has a tool insertion opening that is open in the predetermined direction; and a mounting device and a separation device that is mounted in the tool insertion opening of the tool guide and that moves in the predetermined direction together with the tool guide according to the rotation of the mover and that comes in close contact with an outside circumference of the sensor cap that is mounted in the wheel bearing assembly, wherein the separation device is configured to separate the sensor cap from the wheel bearing assembly by pulling the sensor cap and the mounting device is configured to mount a new sensor cap in the wheel bearing assembly by pushing the new sensor cap, respectively, wherein the mounting device includes an installer that has an outside circumference corresponding to an inside circumference of the tool insertion opening and that mounts the new sensor cap in the wheel bearing assembly by pushing a cap jaw that is formed along a circumference of the new sensor cap, when the tool guide moves forward thereof, wherein the installer includes an outside diameter absorption device that is configured to compensate an outside diameter tolerance of the new sensor cap, and wherein the outside diameter absorption device includes an outside diameter absorption ball that protrudes to an inside circumference of the installer, and the outside diameter absorption ball elastically comes in close contact with an outside circumference of the new sensor cap.

2. The sensor cap exchange tool device of claim 1, wherein the separation device includes a collet that has a cup structure having a cap insertion groove that is open to the rear side to insert the sensor cap and that has a collet fixing portion that is extended to a front side to be fixed to the mover at a central portion of the front end portion and that has an outside circumference corresponding to the inside circumference of the tool insertion opening and that has a structure having an increasing outside diameter as advancing backward and that is retracted along an inside circumference form of the tool insertion opening and that has an opening to press and fix the outside circumference of the sensor cap, when the tool guide moves backward thereof.

3. The sensor cap exchange tool device of claim 2, wherein the collet fixing portion is a bolt structure of a collet bolt, the collet bolt penetrates a central portion of the mover to be protruded forward, and a collet nut is engaged with the central portion and thus the collet is fixed to the mover.

4. The sensor cap exchange tool device of claim 2, wherein a slit is formed at a predetermined gap along a circumference thereof of the collet, and a circular extension portion is formed within the slit.

5. The sensor cap exchange tool device of claim 2, wherein a front end portion of the support bolt penetrates a penetration opening of an edge portion of the support bracket, and a support nut is screw engaged e front end portion of the support bolt to fix the support bracket to the support bolt.

6. The sensor cap exchange tool device of claim 1, wherein an installer jaw that comes in close contact with a rear end surface of the tool guide is formed along an outside circumference of the installer, wherein the installer moves backward together with the tool guide when the tool guide moves backward thereof.

7. The sensor cap exchange tool device of claim 1, wherein at an inside circumference of the installer, guide pins that guide a connector that protrudes to an outside surface of the new sensor cap are protruded to a first side and a second side thereof.

8. The sensor cap exchange tool device of claim 7, wherein at the tool guide, a check opening is formed to view an inside from an outside thereof.

\* \* \* \* \*